US011170098B1

(12) United States Patent
Ben-Dor

(10) Patent No.: US 11,170,098 B1
(45) Date of Patent: Nov. 9, 2021

(54) SYSTEM, METHOD, AND MEDIUM FOR PROTECTING A COMPUTER BROWSER FROM THIRD-PARTY COMPUTER CODE INTERFERENCE

(71) Applicant: Source Defense, Rosh HaAyin (IL)

(72) Inventor: Gilad Ben-Dor, Petah Tiqwa (IL)

(73) Assignee: Source Defense Ltd., Rosh-ha'ayin (IL)

( * ) Notice: Subject to any disclaimer, the term of this patent is extended or adjusted under 35 U.S.C. 154(b) by 365 days.

(21) Appl. No.: 16/528,702

(22) Filed: Aug. 1, 2019

Related U.S. Application Data

(63) Continuation of application No. 15/347,765, filed on Nov. 9, 2016, now abandoned.

(Continued)

(51) Int. Cl.
G06F 21/54 (2013.01)
G06F 9/445 (2018.01)
H04L 29/06 (2006.01)

(52) U.S. Cl.
CPC .......... *G06F 21/54* (2013.01); *G06F 9/44526* (2013.01); *H04L 63/308* (2013.01); *G06F 2221/033* (2013.01)

(58) Field of Classification Search
CPC ................. G06F 21/54; G06F 9/44526; G06F 2221/033; H04L 63/308
See application file for complete search history.

(56) References Cited

U.S. PATENT DOCUMENTS 6,301,661 B1 * 10/2001 Shambroom ........... G06F 21/33
                                                                   713/168
6,546,554 B1 *  4/2003 Schmidt ............. G06F 9/44526
                                                                   709/201

(Continued)

OTHER PUBLICATIONS

Gallaba et al., "Don't Call Us, We'll Call You: Characterizing Callbacks in JavaScript" Oct. 22-23, 2015, https://nodejs.org, IEEE, ISBN: 978-1-4673-7899-4, pp. 247-256 (Year: 2015).*

(Continued)

*Primary Examiner* — Harunur Rashid
(74) *Attorney, Agent, or Firm* — Nathan & Associates; Nathan Menachem

(57) ABSTRACT

Computer system, methods, and non-transitory storage medium for protecting a client device that is browsing a website from some undesired actions of third-party software. JavaScript Instrumenter to Secured Code (JISC) code (e.g. JavaScript/WebAssembly) is tailored per website that defines a set of policies of what each third-party code can and cannot do. The server also tracks and analyzes data reports from the websites, and provides reports and alerts to website administrators. Therefore, a browser on a client device visiting the website, and thus executing the JISC code that is tailored for that specific website, is protected from the third-party code, without hindering the proper action of the third-party software and without the third-party knowing that their code was monitored and controlled. Third-party activity can be monitored by the system via the combination of functionality for or more of the following: Instrumentation; Intermittent-Execution; Back-Pack; Policy-Center; Evasion; Debugger; CORS-Proxy; and Flash-Wrapper.

21 Claims, 18 Drawing Sheets

Related U.S. Application Data

(60) Provisional application No. 62/253,669, filed on Nov. 10, 2015.

(56) References Cited

U.S. PATENT DOCUMENTS

| | | | | |
|---|---|---|---|---|
| 9,015,832 | B1* | 4/2015 | Lachwani | H04L 63/1408 726/22 |
| 2008/0222736 | A1* | 9/2008 | Boodaei | G06F 21/14 726/27 |
| 2010/0257610 | A1* | 10/2010 | Hohl | G06F 21/577 726/25 |
| 2011/0247072 | A1* | 10/2011 | Staniford | G06F 21/566 726/24 |
| 2012/0159193 | A1* | 6/2012 | Spradlin | G06F 21/79 713/190 |
| 2014/0189864 | A1* | 7/2014 | Wang | H04L 63/1483 726/23 |

OTHER PUBLICATIONS

Morrow et al., "Debugging Javascrip" Soltech, Inc,. Published on Oct. 30, 2014, SolTech's UI Architect, pp. 1-34 (Year: 2014).*

Barton et al., "Dynamic and Graphical Web Page Breakpoints" Apr. 26-30, 2010, WWW2010, pp. 1-10 (Year: 2010).*

Yu et al., "JavaScript Instrumentation for Browser Security" Jan. 17-19, 2007, DoCoMo Communications Laboratories USA, Inc, ACM 1-59593-575-4/07/0001, pp. 1-13. (Year: 2007).*

* cited by examiner

| User-Code: | Very naive Instrumented-Code: |
|---|---|
| a = utils.random(); <br> b = a * 255; <br> while (b > 0) { <br>     c = buildColor(b); <br>     b--; <br> } <br> showColors(); | set("a", get("utils").get("random").call()); <br> set("b", multiply(get("a"), 255); <br> while (get("b") > 0) { <br>     set("c", get("buildColor").call(get("b"))); <br>     set("b", get("b") - 1); <br> } <br> get("showColors").call(); |

FIG. 3

| Restore-Indexes | |
|---|---|
| User-Code:<br><br>a = utils.random();<br>b = a * 255;<br>while (b > 0) {<br>    c = buildColor(b);<br>    b--;<br>}<br>showColors(); ⇒ | Restore-Indexes:<br><br>a = utils.random();<br>restore-index 1<br>b = a * 255;<br>restore-index 2<br>for (;;) {<br>    if (! (b > 0)) {<br>        break;<br>    restore-index 3<br>    c = buildColor(b);<br>    restore-index 4<br>    b--;<br>    restore-index 5<br>}<br>showColors();<br>restore-index 6 |

If restore-index = X, then the end-of-time-slice occurred...

- restore-index = 1: inside the call to "utils.random()"
- restore-index = 2: just after "var b = a * 255;"
- restore-index = 3: just after checking the condition "(b > 0)"
- restore-index = 4: inside the call to "buildColor(b)"
- restore-index = 5: just after "b--;"
- restore-index = 6: inside the call to "showColors()"

FIG. 4

Less naive instrumented code to demonstrate intermittent-execution
(same user-code as in figures 1,2)

```
if (restoreCallstackFrame) {
  // If restoring execution - then use the restored local variables
  var scope = restoreCallstackFrame.scope;
  var restoreIndex = restoreCallstackFrame.restoreIndex;
}
else {
  var scope = {};
  var restoreIndex = 0;
}

// User-Code:   a = utils.random();
if (restoreIndex <= 1) {
  try {
    scope.a = get("utils").get("random").call();
  }
  catch(exception) {
    if (exception === END_OF_TIME_SLICE_EXCEPTION) {
      // utils.random() encountered an end-of-time-slice,
      // and has already set restoreCallstackFrame.
      restoreCallstackFrame = {
        nextCallstackFrame: restoreCallstackFrame,
        scope:        scope,
        restoreIndex: 1
      };
    }
```

FIG. 7A

```
    throw exception;
  }
}

// User-Code:    b = a * 255;
if (restoreIndex < 2) {
 scope.b = scope.a * 255;

if (timeToEndTimeSlice()) {
   restoreCallstackFrame = {
     nextCallstackFrame: null,
     scope:        scope,
     restoreIndex:    2
   };
  }
 }
}

// User-Code:    while (...) {
if (restoreIndex < 6) {
 for (;;) {

// User-Code:    (b > 0)
   if (restoreIndex < 3) {
    if (! (scope.b > 0))
      break;

if (timeToEndTimeSlice()) {
     restoreCallstackFrame = {
       nextCallstackFrame: null,
```

FIG. 7B

```
      scope:         scope,
      restoreIndex:  3
    };
  }
}

// User-Code:   c = buildColor(b);

if (restoreIndex <= 4) { try { scope.c = get("buildColor").call(scope.b);

} catch(exception) { if (exception === END_OF_TIME_SLICE_EXCEPTION) {

// buildColor(b) encountered an end-of-time-slice,

// and has already set restoreCallstackFrame.

restoreCallstackFrame = { nextCallstackFrame: restoreCallstackFrame, scope:         scope, restoreIndex:  4

};

} throw exception;

}

}

// User-Code:   b--;

if (restoreIndex < 5) { scope.b = scope.b - 1;
```

FIG. 7C

```
    if (timeToEndTimeSlice()) {
      restoreCallstackFrame = {
        nextCallstackFrame: null, callstack-frame
        scope:          scope,
        restoreIndex:   5
      };
    }
   }
  }
 }
}

// User-Code:   showColors();
if (restoreIndex <= 6)
 try {
  get("showColors").call();
 }
 catch(exception) {
  if (exception === END_OF_TIME_SLICE_EXCEPTION) {
   // "showColors"() encountered an end-of-time-slice,
   // and has already set restoreCallstackFrame.
   restoreCallstackFrame = {
    nextCallstackFrame: restoreCallstackFrame,
    scope:          scope,
    restoreIndex:   6
   };
  }
  throw exception;
 }
}
```

FIG. 7D

SYSTEM, METHOD, AND MEDIUM FOR PROTECTING A COMPUTER BROWSER FROM THIRD-PARTY COMPUTER CODE INTERFERENCE

PRIORITY CLAIM

This application is a continuation of U.S. patent application Ser. No. 15/347,765 filed Nov. 9, 2016, and claims priority to Provisional U.S. Patent Application Ser. No. 62/253,669 filed Nov. 10, 2015, which is hereby incorporated by reference in its entirety.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

TRADEMARKS NOTICE

The trademarks, website names, programming language names, etc. that are used in the present disclosure are the property of the respective owner companies and are used herein for illustrative purposes only.

FIELD OF THE DISCLOSURE

The present disclosure relates generally to computer systems, methods, and non-transitory computer storage medium to assist a website in protecting against unwanted or malicious activity resulting from the execution of third-party computer code.

BACKGROUND OF THE DISCLOSURE

Many websites include content from third parties—usually via tags (e.g. <script src="http://thirdparty/ . . . ">). These third parties may provide services to the website, such as ad-serving, analytics, social media, user support, and many other desirable functionalities. Some third parties also include other third parties—most notably ad-servers, which often serve rich experiences that are created by creative-agencies, or defer the serving to other ad-networks. Because of how HTML and JavaScript work, all included third parties in a website can operate completely unrestricted—meaning they have full access to all resources of the website—just as the website's original code has. (The exception is cross-domain <iframe> tags, which are so limiting that they cannot be used in many situations.)

Websites are sometimes hurt by the third-party because of this lack of restrictions. For example, a third-party's server could be breached, and malicious code could deform the website, or steal users' data (mainly on sites with log-in). And/or a third-party may replace a website's paid ads with its own ads. And/or a third-party can harvest information on the users, to be stored on cookies and allow better targeting of ads on other websites (a.k.a. "behavioral targeting"). Websites want to get paid to allow such harvesting, but any third-party—even one which is in-directly included—can do that without paying the website.

Therefore, there is a great need for a computerized system that allows websites to execute third-party computer code under restricted permissions to prevent undesired third-party activity that adversely affects the client user device. In particular, there is a need within the industry for a computer system, method(s), and non-transitory computer readable storage medium to assist a user, such as a website administrator, in defining and enforcing limitations on third-party activity in real-time. All types of third-party activity should be monitored by the system via the combination of functionality, for example (to be explained herein): Instrumentation or Compilation; Intermittent-Execution; Back-Pack; Policy-Center; Evasion; Debugger; CORS-Proxy; and Flash-Wrapper.

SUMMARY OF THE DISCLOSURE

The various embodiments of the present disclosure comprise computerized systems, methods, and non-transitory computer readable storage medium for allowing a website that instructs the browser of a computer to include third-party code (e.g. Java-Script, WebAssembly, HTML, CSS, Flash), to limit the permissions of this code in the browser—with minimal interference of the third-party's algorithm (the principle of "Evasion"). This will block the third-party algorithm from engaging in unwanted behavior on a user's electronic computing device without the third-party's knowledge of this blocking or evasive activity.

In the various embodiments, any and all types of third-party activity can be monitored by the system via the combination of functionality for one or more of the following, or any combination thereof: Instrumentation; Intermittent-Execution; Back-Pack; Policy-Center; Evasion; Debugger; CORS-Proxy; and Flash-Wrapper.

Instrumentation:

The most important basic computer process of the present disclosure comprises building Instrumented-Code from a third-party User-Code, so that it may be executed. The instrumentation process disclosed herein comprises in one embodiment the general steps of: the client browser loading a website; the website instructing the browser to load the present disclosure's JavaScript computer code, a.k.a. JavaScript Instrumenter to Secured Code (JISC), which comprises Java-Script/WebAssembly code from a Java-Script library; the website instructing the browser to load a third-party code (User-Code) in a textual way via the JISC; the JISC generating an Instrumented-Code based on the User-Code; and the browser executing the Instrumented-Code while evading un-permitted actions.

The Instrumented-Code can be implemented in many embodiments, comprising of, but not limited to: 1. Instrumented JavaScript, 2. Instrumented Proprietary-Code, and 3. Instrumented WebAssembly.

The "Instrumented JavaScript" embodiment comprises parsing the user-code into a new JavaScript code that follows the exact algorithm of the original user-code, while making sure to perform all actions in a secured way. The "Instrumented JavaScript" must support "intermittent execution" as disclosed herein: the ability to suspend execution at any time, and later resume it.

The "Instrumented Proprietary-Code" embodiment comprises parsing the user-code into a proprietary data-structure that is similar in structure to a standard assembler code: a sequence of low-level commands for manipulating data and calling functions. The actual execution is performed command-by-command by a proprietary algorithm. As usual with executing assembler, a stack needs to be maintained: the stack contains local variables and execution-pointers (when a function is called, the current execution-pointer is stored in the stack, so that when the function ends, the execution can resume to the calling function). The executing algorithm can be implemented in asm.js or WebAssembly, which will dramatically enhance performance. In this case, the stack should still be implemented as a JavaScript data-structure, because it must contain JavaScript Objects—which are not supported by asm.js, nor WebAssembly. This entails that all the low-level commands that manipulate the stack be implemented as JavaScript functions, and be called by the executing algorithms (which is implemented by asm.js or WebAssembly). Another big advantage of this embodiment is intermittent execution (suspending and resuming execution) is very easy to support, as the execution is made manually by the proprietary algorithm.

The "Instrumented WebAssembly" embodiment is similar to the "Instrumented Proprietary-Code" embodiment, only the instrumented code is a standard well-formed WebAssembly. This provides better performance of the user electronic computing device because the browser can execute it natively, however it is more difficult to suspend and resume—because the execution is performed natively by the browser—just as in the "Instrumented JavaScript" embodiment.

Intermittent Execution:

the "Intermittent-Execution" feature enables the instrumented-code to be executed asynchronously and intermittently to prevent the browser from being stuck, or the website from being fully shown. This feature is also required to support the JISC debugger as disclosed herein.

This advanced computer process for Initiation of an Intermission in the execution of the instrumented-code in the "Instrumented JavaScript" embodiment comprises the steps of FIG. 5: the Instrumented-Code directing the browser to check the computer time and determine if it is taking too long to execute; and if so, then the Instrumented-Code instructs the browser to build a call-stack for the current subroutine. When or if this current subroutine is called by another subroutine, the callee-subroutine's call-stack frame will be referenced by the caller-subroutine's call-stack frame and the steps are repeated. Otherwise, a comeback time is scheduled.

And this feature further comprises the steps for Restoration of the Execution after an intermission, which comprises the steps of FIG. 6: the Instrumented-Code is executed in the context of the top-level call-stack frame; and the subroutine restores all local variables and skips to the restoration point. When the restore index references a call subroutine command, the subroutine is called in the context of the next call-stack frame. Otherwise, the execution's restoration is complete, and execution is continued normally without a call-stack context.

Policy-Center and Evasion: The present disclosure further comprises a Policy-Center for determining how to handle different types of third-party activity, comprising: Throw, Ignore or Evade. In the "throwing" scenario, the third-party act is considered "outrageous" or "rude", and is blocked (FIG. 8—Left Path).

But, for third-party undesirable actions whose abortion has no or minimal side effects on the user-code, the Policy-Center may decide to "Ignore or skip an action" without the third-party's awareness. This course of action is taken when there is expected to be no negative side effects to the smooth operation of the third-party code, or when there are no alternatives (FIG. 8—Middle Path).

Or when the Policy-Center cannot allow the third-party code's action, it decides to evade it while letting the third-party believe that the action was performed because there are no visual or otherwise "real" effects on the browser (FIG. 8—Right Path).

CORS-Proxy:

The present disclosure further comprises a CORS-Proxy process, for example when the user-code makes an HTTP request. The method comprises the steps of FIG. 9 of consulting the Policy-Center on how to proceed based on how a URL is initiated, wherein the Policy Center decision comprises one of the following: a Grant decision to proceed with the URL unchanged; a Deny decision to proceed with an invalid URL that will fail; an Alter the URL decision, comprising altering the URL to avoid cross-domain cookies; or, a Full Processing the URL decision comprising using an XMLHttpRequest to request the URL as text. The Altering or Fetching decision further comprises using CORS-Proxy URL.

JISC-Debugger:

The present disclosure further comprises a system and method comprising a JISC-Debugger for supporting breakpoints. The method comprises the steps of FIG. 11 comprising: suspending the algorithm by the JISC-debugger when the JISC encounters a break-point; producing a full call-stack object comprising all local variables when the suspension is complete; optionally, requesting an evaluation of a JavaScript expression in the context of some call-stack frame by briefly resuming the intermittent-execution, wherein a local "eval" is performed and the result is stored; suspending the algorithm and completing the evaluation—which is visualized by the JISC-Debugger-Console; and when the user chooses to continue, thereby resuming the intermittent-execution.

Flash-Wrapper:

The present disclosure further comprises a Flash-Wrapper process for executing a Flash (a Small Web Format "SWF" file) inside the belly of a proprietary Flash that knows how to load a third-party Flash, to instrument it, and then to execute it, and monitor every action the Flash tries to do.

The Flash-Wrapper method comprises the steps of FIG. 12: instructing the JISC, by the user-code, to construct a Flash-player with the Flash-Wrapper URL; when the JISC Flash-Wrapper URL is loaded, then instructing by the JISC to load the original URL as bytes; parsing the bytes into an internal data-structure comprising elements; altering one or more elements in the internal data-structure, wherein URLs in the data-structure may be changed to CORS-Proxy URLs, or an ActionScript in the data-structure is altered; re-constructing an instrumented SWF from the altered internal data-structure; executing the re-constructed SWF by the Flash-Wrapper and by using a Flash's "Loader.loadBytes" functionality; and, consulting the Flash-Wrapper by the instrumented SWF whenever a problematic action is encountered.

Proxy Objects Versus Back-Pack Objects:

The JISC system further comprises the use of "back-pack-objects"—or alternatively—"proxy objects". In the proxy embodiment, a proxy-object is established per every problematic object and ensures that the user-code never gets a reference to the real object. Instead, the user-code gets a reference to a proxy object, which is an object that can properly handle every user-code manipulation.

In the Back-Pack embodiment, a "back-pack object" is attached to every object that the user-code encounters. This back-pack object, which is inaccessible to non-JISC code, holds permissions, and other data that JISC needs in order to properly manipulate the "real" object.

The method of attaching the back-pack to the object comprises the steps of FIG. 13: maintaining a backPacksMap WeakMap comprising a map from an Object to its Back-Pack object; attempting to add an entry into backPacksMap when JISC tries to associate a new back-pack to a real object; and, when the attempt fails, then JISC will associate the back-pack to the object using a property, wherein any non-JISC code is unable to alter or read the back-pack object. And the method for getting a reference to the back-pack from the object comprises the steps of FIG. 14: attempting by JISC to get the back-pack of an object by using the WeakMap; and, when the attempt fails, retrieving the back-pack by using the property of the object.

The present disclosure also has the advantage of storing "Policies" and permissions for third-party code for each website with an account on the JISC server. The JISC Java-Script/WebAssembly code itself resides in individual website device files, or records, on the JISC remote server, and is processed by the server algorithm according to the website visitor device's browser type and effective policies, and before being sent to the website visitor device's browser.

Another advantage of the present disclosure is the ability of the JISC remote server to monitor specific actions of the third-party code, which can be recorded for alerts to the website's administrator, and for later analysis and reporting.

The various embodiments of the present disclosure further comprise non-transitory computer readable storage medium and/or a module accessible on an electronic computing device comprising the medium, that comprises instructions, the instructions being operable to enable the device to perform a procedure for protecting a computer visiting a website from a third-party malicious software that is executed within the website without the website's knowledge or permission.

In an embodiment, the present disclosure is an electronic computing device or a remote server comprising: a non-transitory computer-readable storage medium, that stores instructions which, when executed by a processor, direct the processor to perform the computer method(s) disclosed herein.

Likewise, in an embodiment, the present disclosure is an article of manufacture and/or an apparatus (e.g. remote system server, user-visitor and/or website administrator electronic computing device) having one or more non-transitory computer readable storage medium storing instructions thereon which, when executed by a system, cause the system to perform the computer method(s) disclosed herein, such as when the apparatus is a JISC remote-cloud based server: generate a tailored JISC Java-Script/WebAssembly code per site, handle reports from the sites, and provide reports and alerts to site administrators.

BRIEF DESCRIPTION OF THE DRAWINGS

The above and other features, aspects, and advantages of the present disclosure will become better understood with regard to the following description, appended claims, and accompanying drawings where:

FIG. 3 is an exemplification of very naive instrumented-code to show how JISC can control every action (This figure relates to the "Instrumented JavaScript" embodiment. The instrumentation for the "Instrumented Proprietary-Code/WebAssembly" embodiments is more strait forward and standard).

FIG. 4 an exemplification of the Restore Indexes method. (This figure relates to the "Instrumented JavaScript/WebAssembly" embodiments: implementation in the "Instrumented Proprietary-Code" embodiment is trivial).

FIGS. 7A-7D are an exemplification of the computer code in the Intermittent-Execution Support computer method. (This figure relates to the "Instrumented JavaScript" embodiment).

DETAILED DESCRIPTION OF EXAMPLE EMBODIMENTS

Glossary of Terms

Figure 1A:
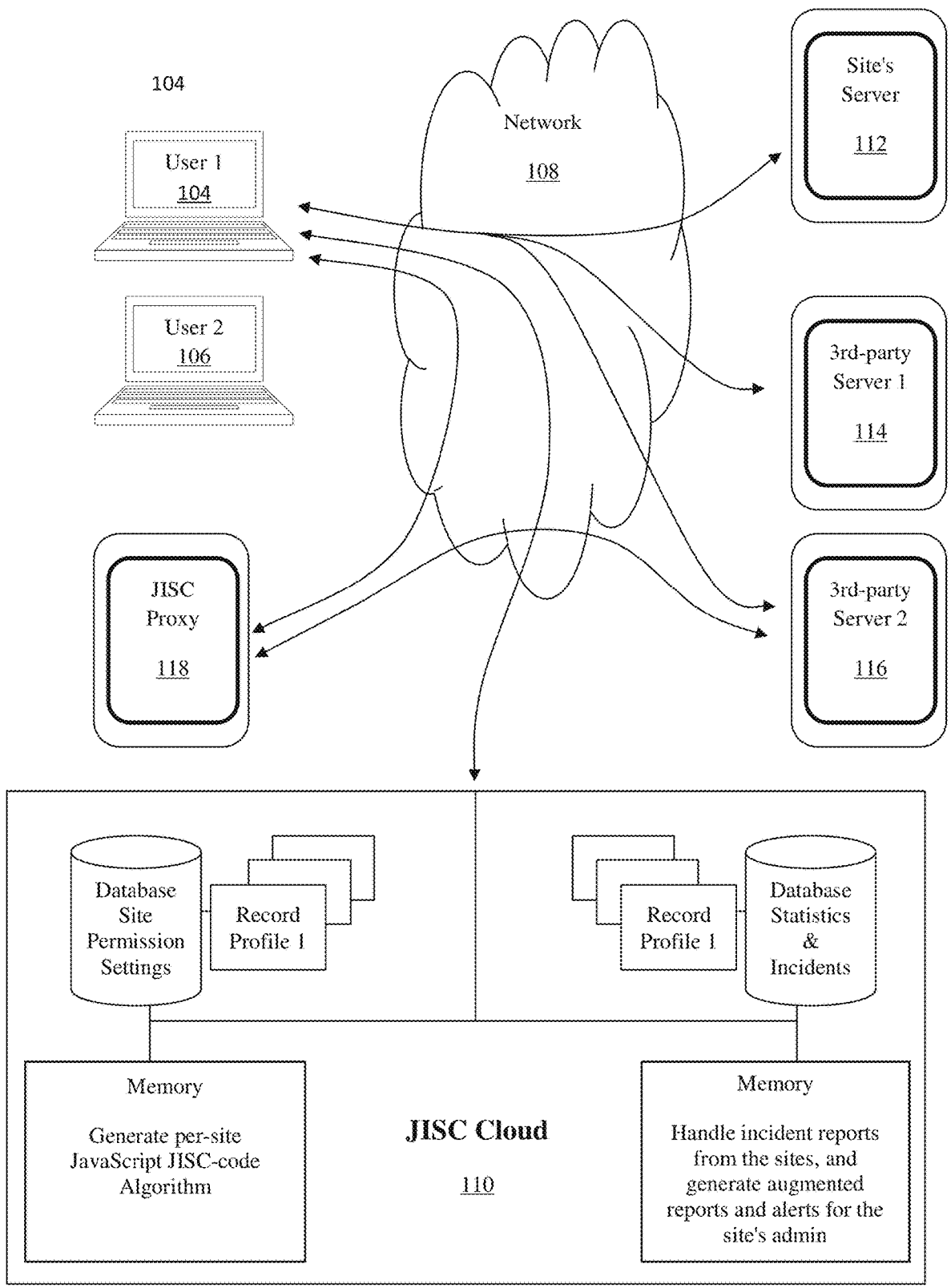
FIG. 1A is a schematic diagram of an exemplary embodiment of the system architecture comprising one or more end-user electronic computing devices communicating with a JISC remote system server.
Figure 1B:
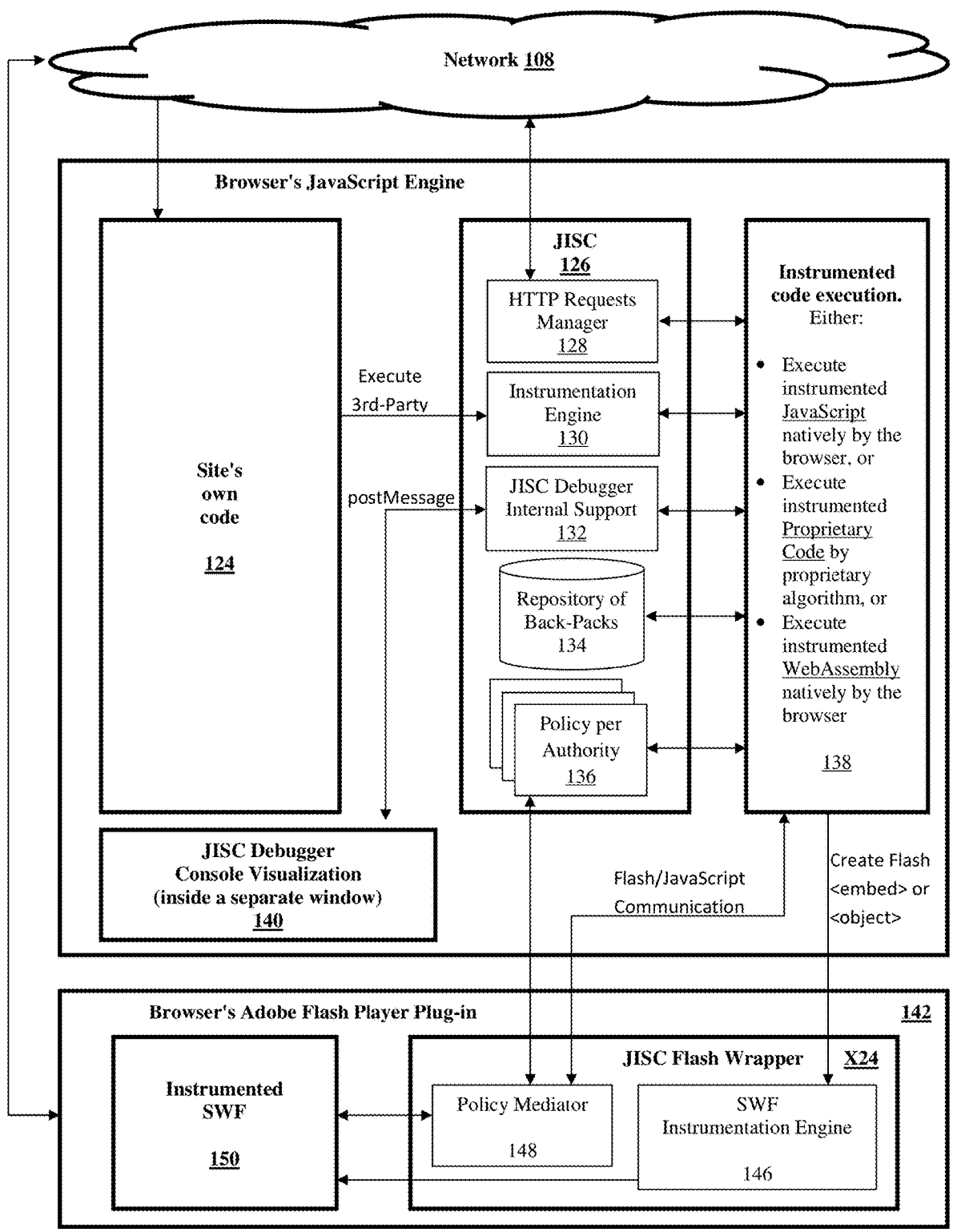
FIG. 1B is a schematic diagram of the JISC system installed on an end-user electronic computing device comprising the software entities inside of the device browser.

As used herein, the term "JISC" refers to the present disclosure's computer code or instructions within the non-transitory computer readable storage medium, which is also called JavaScript Instrumenter to Secured Code, and in the exemplified embodiments herein is presented and/or performed by the Instrumentation Engine 130, in FIG. 1B.

As used herein, the term "Electronic Computing Device" refers to any electronic communications or computing device comprising a central processing unit (i.e. processor) with the Internet connectivity and a graphical display or screen, such as: laptops, desktops, tablets, iPads, smartphones, personal digital assistant devices, and the like, that enable the user to input user identifying information, and order and view a user profile.

As used herein, the term "Software" refers to computer program instructions adapted for execution by a hardware element, such as a processor or CPU, wherein the instruction comprises commands that when executed cause the processor to perform a corresponding set of commands. The software may be written or coded using a programming language, such as JavaScript or WebAssembly, and stored using any type of non-transitory computer readable storage medium or machine-readable storage medium well known in the art. Examples of software in the present invention comprise any software components, programs, applications, computer programs, application programs, system programs, machine programs, and operating system software that is JISC code compatible. Although the JISC code mainly instruments and executes JavaScript®, it also effectively works with and on (i.e. third-party code) a wide variety of other computer code, such as by way of non-limiting examples WebAssembly, HTML, CSS, and Adobe®-Flash, and in principle any syntax that is supported by browsers.

As used herein, the term "Application Program Interface (API)" refers to a set of computer programming instructions, for accessing a web based software application or web tool. In the present invention, the API is computer software that is stored in the system server computer memory. The API functions to enable the module to access the system to and order the system to conduct JISC functions.

As used herein, the term "Module" and "Algorithm" refer to a portion of a computer program or software that carries out a specific function and may be used alone or combined with other modules of the same program. The module, algorithm may comprise a native application, a web application, or a widget type application to carry out the methods of detecting and electronically transmitting untranslated character strings. In a one embodiment, a native application is installed on the administrator's and users' device, wherein it is downloaded automatically from the Internet. It may be written in a language to run on a variety of different types of devices; or it may be written in a device-specific computer programming language for a specific type of device. In another embodiment, a web application resides on the system server and is accessed via the Internet. It performs basically all the same tasks as a native application, usually by downloading part of the application to the device for local processing each time it is used. The web application software is written as Web pages in HTML and CSS or other language serving the same purpose, with the interactive parts in JavaScript or other compatible language. Or the application can comprise a widget as a packaged/downloadable/installable web application; making it more like a traditional application than a web application; but like a web application it uses HTML/CSS/JavaScript and access to the Internet.

As used herein, the term "System" may be used to claim all aspects of the present invention wherein it refers to the entire configuration of hardware and software in all embodiments; and a "Computer System" may refer to a system having one or more computers, where each computer may include a non-transitory computer readable storage medium storing software to operate the computer or one or more of its components. Examples of a computer system may include: a distributed computer system for processing information via computer systems linked by a network; two or more computer systems connected together via a network for transmitting and/or receiving information between the computer systems; a computer system including two or more processors within a single computer; and one or more apparatuses and/or one or more systems that may accept data, may process data in accordance with one or more stored software programs, may generate results, and typically may include input, output, storage, arithmetic, logic, and control units.

As used herein, the term "Computer-Readable Storage Medium" refers to a non-transitory medium that participates in providing data (for example, instructions) which may be read by a computer, a processor or a like device.

As used herein, the terms "Generating", "Processing," "Computing," "Calculating," "Determining," "Establishing", "Analyzing", or the like, may refer to operation(s) and/or process(es) of a computer, a computing platform, a computing system, a computer central processing unit (CPU), or other electronic computing device, that manipulate and/or transform content data represented as physical (e.g., electronic) quantities within the computer's registers and/or memories into other data similarly represented as physical quantities within the computer's registers and/or memories or other information storage media that may store instructions to perform operations and/or processes.

Various embodiments of the presently disclosed subject matter may include or be embodied in the form of computer-implemented methods or processes and apparatuses or electronic computing devices for practicing those methods or processes; and, in the form of a computer program product having computer program code containing instructions embodied in non-transitory and/or tangible medium or media, such as floppy diskettes, CD-ROMs, hard drives, USB (universal serial bus) drives, or any other machine readable storage medium, wherein, when the computer program code is loaded into and executed by a computer, the computer becomes an apparatus for practicing embodiments of the disclosed subject matter.

The various embodiments of the present disclosure may also be in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer the computer becomes an apparatus for practicing embodiments of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions.

And, the various embodiments may be implemented using hardware that may include a processor, such as a general-purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

System Architecture

FIG. 1A is a schematic diagram of an exemplary embodiment the system architecture comprising one or more user (client) electronic computing devices 104, 106 visiting via a network 108 a website hosted by a website administrator server 112, wherein it is understood that the system comprises a one or more (e.g. a plurality) of website administrator server's or computing devices 112. Third-party servers 114, 116 send computer code that may perform some undesired actions on the browser on devices 104, 106 by attempting to insert unwanted and/or malicious computer code. The JISC remote (e.g. cloud) system server 110 and the JISC proxy computer 118 prevent this by generating a tailored JISC Java-Script/WebAssembly code per website, such as the website hosted by server 112.

In an embodiment, when the browser on device 104, 106 visits server 112 website, then device 104, 106 browser will automatically load the JISC computer code that was customized for device's 112 website. The JISC code on device 104, 106 browser will then load the third-party code from the third-party servers 114, 116, and execute it while monitoring and preventing unwanted activity without the third-party's knowledge (i.e. the principle of "Evasion").

The JISC server 110 also comprises a computer memory to record and analyze incidents, and a database to store incident reports and statistical computation reports about the incidents. A record, or computer file, is kept for each website's reports (e.g. occurring on the visitor's device 104, 106, due to the third-party code). Data derived from the reports and the statistical analysis of third-party incidents are used when electronically transmitting messages to website administrators of device 112.

The JISC server 110 also comprises computer memory to generate JISC code tailored for a particular website hosted by server 112, for each of a plurality of website servers, and a database comprising a record, or computer file, for each website's permission settings (e.g. "policy"). The JISC code itself resides in website device 112 files on server 110, and is processed by a server 110-side algorithm according to the user devices 104, 106 browser type and effective policies for website 112, before being sent to the browsers on device 104, 106.

In one embodiment, the JISC computer program code, modules, and algorithms comprising instructions for monitoring third-party code is executed entirely on the website visitor's electronic computing device 104, 106. In another embodiment, it may execute partly on the website server 112 and partly on the website visitor electronic computing device 104, 106. In another embodiment, the JISC code operates entirely on the website server 112, or the JISC Proxy server 118, or the JISC remote server 110. Other configurations are readily apparent to, and configurable by, the skilled artisan.

The network 108 connects the visitor devices 104, 106 to the website server 112, and the website server 112 to the JISC server 110, and the third-party servers 114, 116 to with server 112's website browser. Network 108 may comprise any type of network well known to the skilled artisan in computer networking, and by way of non-limiting examples include: a local area network (LAN) or a wide area network (WAN), or the connection may be made to an external computer (for example, through the Internet using an Internet Service Provider), and using wired, wireless, and terrestrial or satellite links.

User's Electronic Computing Device (Client)

FIG. 1B is a schematic diagram of the JISC system operating on a user browser device 104, 106, and comprising the software entities operating inside of the device browser. The upper half of FIG. 1B illustrates the JavaScript components in the browser's JavaScript engine.

Component 124 is all the JavaScript outside JISC: the site's code and other un-managed third-party's code.

Component JISC 126 is the JISC module, which contains many components, of which the most important are: components 128, 130, 132, 134, and 136

Component 128 is the HTTP requests manager, which consults with the policy-center (136) on how to handle every URL, and performs the necessary steps to process them.

Component 130 is an instrumentation engine that performs the compiler method that receives user-code, and returns an instrumentation of it (e.g. it converts JavaScript code to either a JavaScript/Proprietary/WebAssembly code that can be executed securely). This is the "heart" of JISC. The instrumented code is then executed in component 138.

Component 132 provides internal support methods for the JISC-Debugger. Note that when JISC-Debugger is turned on, the instrumentation mechanism (130) produces "heavier" and slower instrumentations to support debugging.

Component 134 is a repository that manages all the back-packs, such as: it holds all the back-pack instances, and the code of all kinds of back-packs (e.g. window-back-pack, document-back-pack, html-div-element-back-pack, user-code-owned-object-back-pack, etc.). This allows for smart handling of all manipulations that the user-code can do on all objects.

Component 136 is the policy-center that is used to decide how to manage each and every user-code action. The settings in the policy-center are derived from the website-administrator's instructions.

Component 138 shows the executing of the instrumented-code.

Component 140 is the JISC-Debugger GUI code, which is executed in a dedicated window with a different domain (JISC's domain), and which interacts with JISC via "postMessage".

The lower half of FIG. 1B illustrates JISC's components in the Adobe® Flash-Player engine 142. Component 144 is the Flash-Wrapper SWF that wraps an instrumentation of the original third-party's SWF 150.

Component 146 is the Flash-Wrapper module that parses, alters and finally re-constructs an instrumented version of the original third-party's SWF150.

And, component 148 is a small policy-mediator module inside the Flash-Wrapper, that, when needed, consults the main Policy-Center in JISC via Flash's "ExternalInterface.call".

Main Computer Method

Figure 2:
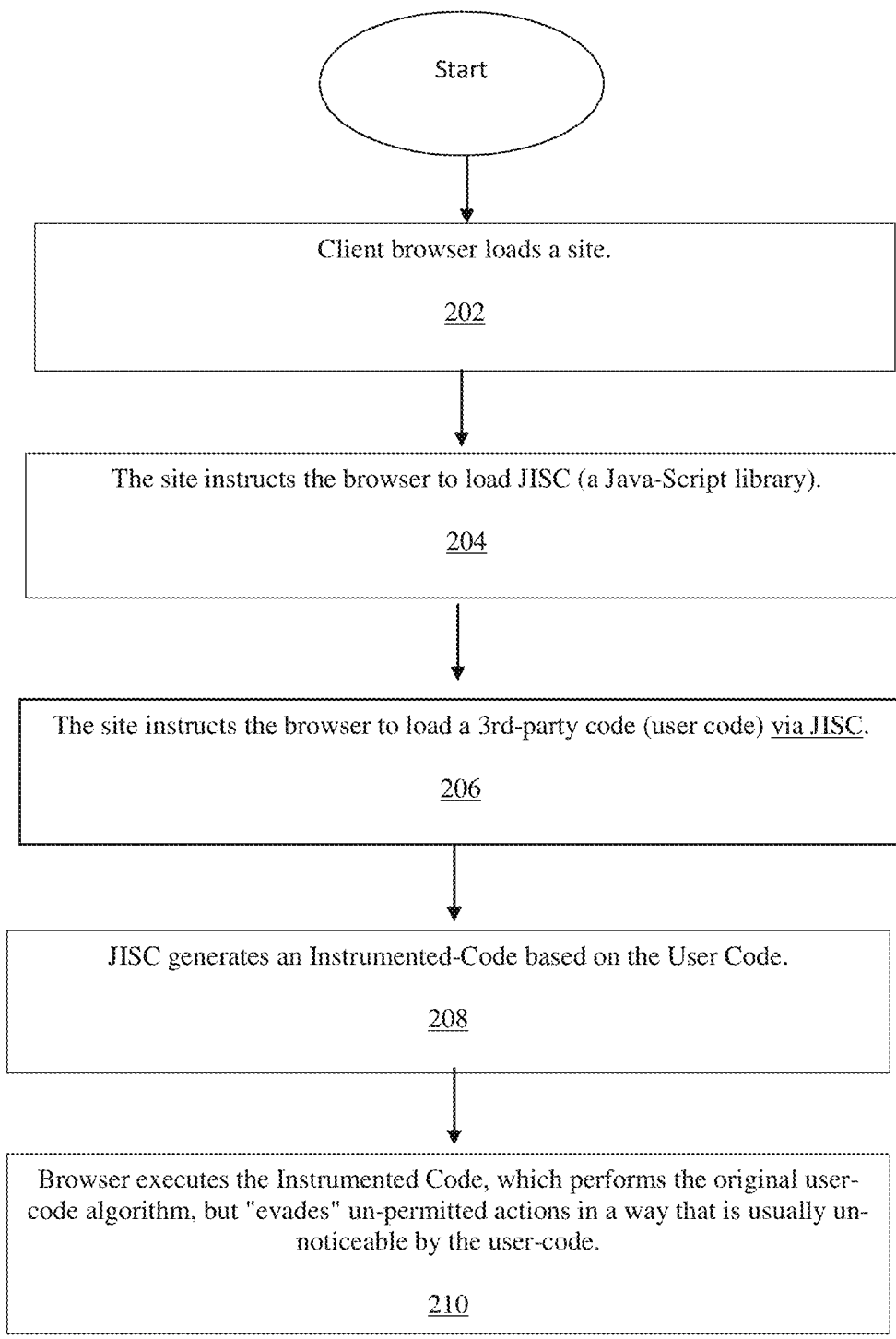
FIG. 2 is a flowchart of computer steps for the main algorithm, a.k.a. the main computer method for instrumentation of user-code.

FIG. 2 is a flowchart illustrating the basic computer process to build Instrumented-Code from a User-Code on the website administrator's device or account 112, and as illustrated in FIGS. 1A and 1B. In step 202, the browser on a user (i.e. website visitor) electronic computing device 104 and/or 106 loads a website generated from the website administrator device 112.

In step 204, the website loads the JISC Java-Script/WebAssembly code from the JISC server device 110.

In step 206, the website—through JISC—instructs the browser to load third-party code from a third-party server 114,116. The loading is made textually—via XMLHttpRequest, and the textual third-party user-code is handed to JISC. This is herein referred to as the "User-Code".

In step 208, JISC generates an Instrumented-Code based on the User-Code. The "Instrumented-code" executes in the computing device 104, 106 to build an Instrumented-Code that performs the same algorithm as the User-Code; but, it allows JISC to inspect and control each and every computer action. The Instrumented-Code has a special feature: it executes intermittently—in time-slices—so as not to execute for too long and thus prevents a webpage from freezing up, or sticking. Also, when in debug-mode, the Instrumented-Code supports break-points, so as to allow debugging. The break-point relies on the intermittent nature of the Instrumented-Code: i.e. this mechanism allows it to smoothly suspend and resume the execution.

In step 210, the browser of computer 104, 106 executes the Instrumented-Code, which performs the original user-code algorithm, but evades un-permitted actions in a way that is usually un-noticeable by the user-code. Naturally, while the instrumented-code executes, it may want to execute dynamically generated user-code (i.e. emulate User-Code calls to "eval", "new Function", "onclick", "setTimeout", and more); and this would recursively call the "Main Algorithm". An exemplification of this main computer method is found in FIG. 2.

Advanced Computer Methods

Intermittent-Execution Support

JavaScript® is, by definition, single threaded, meaning that two algorithms cannot be executed concurrently (HTML5 introduces the new "Web Worker"—but it is extremely restricted). This entails that while an algorithm is executing, the page freezes and it cannot react to any user interaction. Because JISC is expected to slow down the third-party code execution, it is crucial that if the third-party code executes for too long, then JISC will be able to "take a break"—i.e. make an intermission, allow the other non-JISC algorithms to execute, and then, later, to restore execution from the exact state where it left off. This mechanism is called "Intermittent Execution", and is woven deeply into JISC. This mechanism is also mandatory for the support of the JISC debugger.

Figure 5:
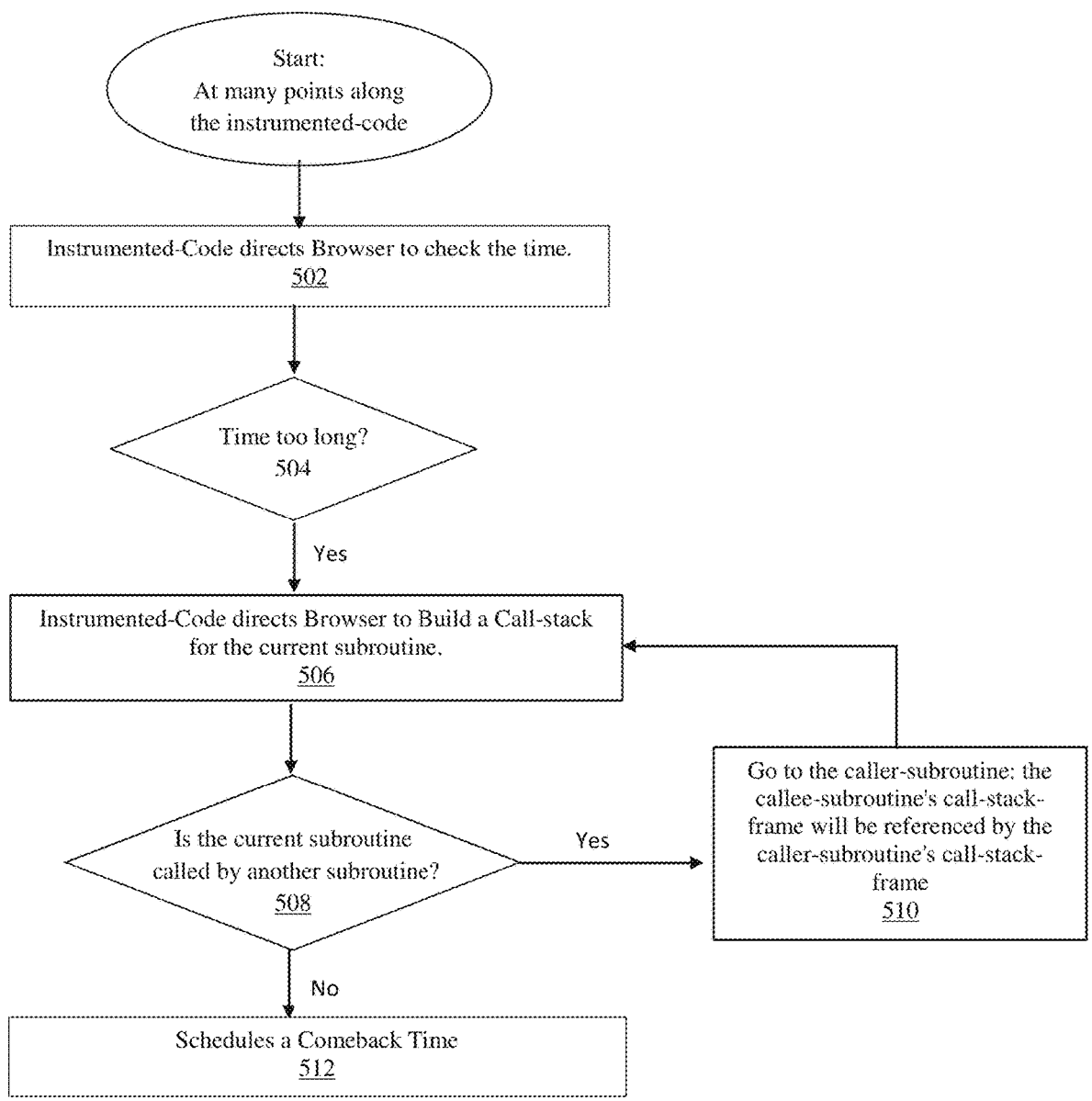
FIG. 5 is a flowchart of computer steps for the Intermittent-Execution comprising how an intermission is initiated. (This figure relates to the "Instrumented JavaScript/WebAssembly" embodiments: the implementation in the "Instrumented Proprietary-Code" embodiment is trivial).
Figure 6:
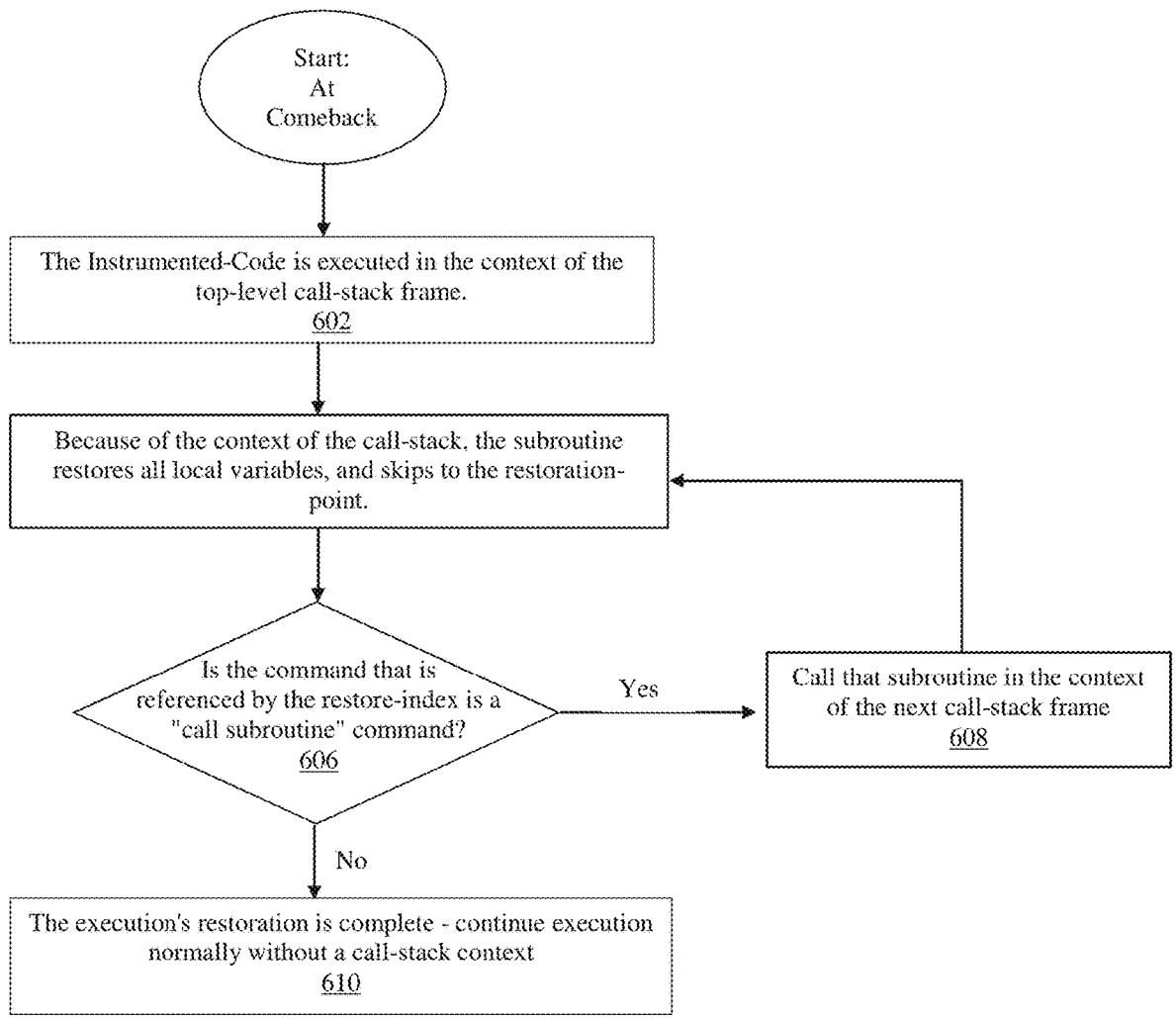
FIG. 6 is a flowchart of computer steps for the Intermittent-Execution comprising how execution is restored after an intermission. (This figure relates to the "Instrumented JavaScript/WebAssembly" embodiments: the implementation in the "Instrumented Proprietary-Code" embodiment is trivial).

Thus, the various embodiments disclosed herein further comprise the Intermittent-Execution Support method. FIG. 5 and FIG. 6 illustrate the primary steps for this computer method at many points along the instrumented-code; and, FIGS. 7A-7D are an exemplification of the instrumented-code that is generated by this method—in the "Instrumented JavaScript" embodiment.

In step 502, when the instrumented-code starts to execute, it records the start-time. Every point in the Instrumented-Code has a sequential "restore-index" (see FIG. 4 for an exemplification).

In step 504, the Instrumented-Code checks the current time, and determines if it has been too long (e.g., 0.1 seconds). If so, then in step 506, the Instrument Code directs the computer to build a "Call-stack Frame" (an item in the call-stack) for the currently executing subroutine. A call-stack frame contains the restore-index, all local-variables (including "this" and the function's parameters), and optionally a reference to a call-stack frame for a callee subroutine. Thus, a call-stack (which is a single-linked-list of call-stack frames) holds all information needed to restore the execution of the program.

In step 508, the Instrumented-Code checks if the current subroutine is being called by another subroutine. If so, then in step 510, the Instrumented-Code throws a special "end-of-time-slice-exception", in order to pass control to the caller-subroutine (which is instrumented to handle this special exception). Step 506 is then performed on the caller subroutine: the caller-subroutine's call-stack-frame that will be generated at step 506 will reference the callee-subroutine's call-stack-frame that was just generated.

In step 512, by the time the top-level function throws "end-of-time-slice-exception", the JISC code has a full Call-stack, which contains all the data necessary to resume the execution from the exact place and state it was suspended in. The JISC code then ends (allows other, non-JISC Java-Scripts to execute), but not before scheduling FIG. 6 (via "setTimeout").

In FIG. 6, step 602, when the comeback time arrives, the JISC code regains control, sets the call-stack into a global variable "Restore-Call-Stack", and calls the top-level (instrumented) function.

In step 604, when an instrumented-function starts to execute, it checks if "Restore-Call-Stack" is set. If it is, then the function performs the following steps to restore the execution. In step (a): it sets all local variables (including parameters) according to the top Call-stack Frame. In step (b) it enters "skip mode"—in which the algorithm does not perform any real action until the restore-index (that is held in the top Call-stack Frame) is reached.

In step 606 if the restore-index is exactly at a point where another function is called, then (in step 608) the calling-function removes the top call-stack frame, and calls the called-function—that will again perform these restore-execution steps.

In step 610, once the restore-index is reached, and the stack of Call-stack is exhausted—then "Restore-Call-Stack" is cleared, and the function resumes standard execution.

Note that supporting intermittent-execution becomes more complex when it should support:
  Control statements (if, while, for, switch, break, etc.)
  Exceptions and "finally": try { . . . } catch(exception) { . . . } finally { . . . }
  Complex expressions—expressions that call nested functions—like "a(b( ))"; and,
  Getters/setters (using a property or assigning into a property may call a function—which may throw exception or encounter end-of-time-slice).

Scopes

As exemplified in FIGS. 7A-7D, the method may comprise the use of scopes. A scope is a set of variables, such as a Globe Scope, a Function Scope, a With Scope, or a Catch Scope.

A Global Scope holds all the properties of a "window" object. For example, in Java-Script, "x=0" is equivalent to "window.x=0", unless "x" is explicitly defined as a local variable.

A Function Scope holds all of the local variables of a function, including "this" and "arguments".

A Catch Scope only holds the exception object inside a "catch" block:
  try {
    throw 123;
  } catch(exceptionVariable) {
    . . . here, exceptionVariable is 123 . . . .
  }

A With Scope allows direct access to all properties of any object:
  var object={a: 111, b: 222};
  with (object) {
    alert(a); ⇐this will alert 111—
    even without the "object." prefix
  }

All types of scopes, except global-scopes, have a parent-scope. If a variable-name is not found on the scope, then the system falls back to the parent-scope. For example:

```
x=1;
y=2;
z=3;
function F1( ) {
  var x=11;
  var y=22;
  function F2( ) {
    var x=111;
    alert(x); ⇐this will alert 111—using the F2's scope
    alert(y); ⇐this will alert 22—falling-back to F1's
      scope
  alert(z); ⇐this will alert 3—falling-back to the global-
    scope
  }
  F2( );
}
F1( );
```

In FIGS. 7A-7D, the "scope" object was too naive. In reality, the Function-Scope, With-Scope and Catch-Scope objects contain the property "parentScope", and to avoid conflicts and reserved properties like "_proto_", all local-variable names are prepended a "$". Thus, the local variable "a" will use "scope.$a".

On the other hand, the Global-Scope and With-Scope do not need a "scope" object, as the variables are stored on the window object (for global-scope) or on the with-object (for with-scope). Thus, reading the value of the variable "a" will be instrumented as something like: get(window,"a").

Re-Constructing Scopes for "Local Eval"

A "local eval" is a simple call to the Java-Script native "eval". This call receives a JavaScript code as a string, and executes it in the local scope. For example:

```
var a=1;
var b=2;
function f( ) {
  "use strict";
  var a=3;
  eval("log(a,b)"); ⇐this will log 3,2 (local eval)
  new Function("log(a,b)") ( ); ⇐this will log 1,2 (global eval)
  (1,eval)("log(a,b)"); ⇐this will log 1,2 (global eval)
}
```

As can be seen, only the simple way of calling "eval" is executed locally—meaning—using the local scope's variable.

When instrumenting the above code, JISC recognizes that the function "f" contains a local-eval. This will hint JISC to make sure that the instrumented-code of the function "f" has a description of all the local variables in "f", so that when "log(a,b)" is eval'ed—then getting the value of "a" solely uses the scope of "f", and getting the value of "b" solely uses the Global-Scope (note that if "use strict" is not specified, then getting the value of "b" must check whether to use the scope of "f", before using the Global-Scope).

Policy-Center and Evasion

Figure 8:
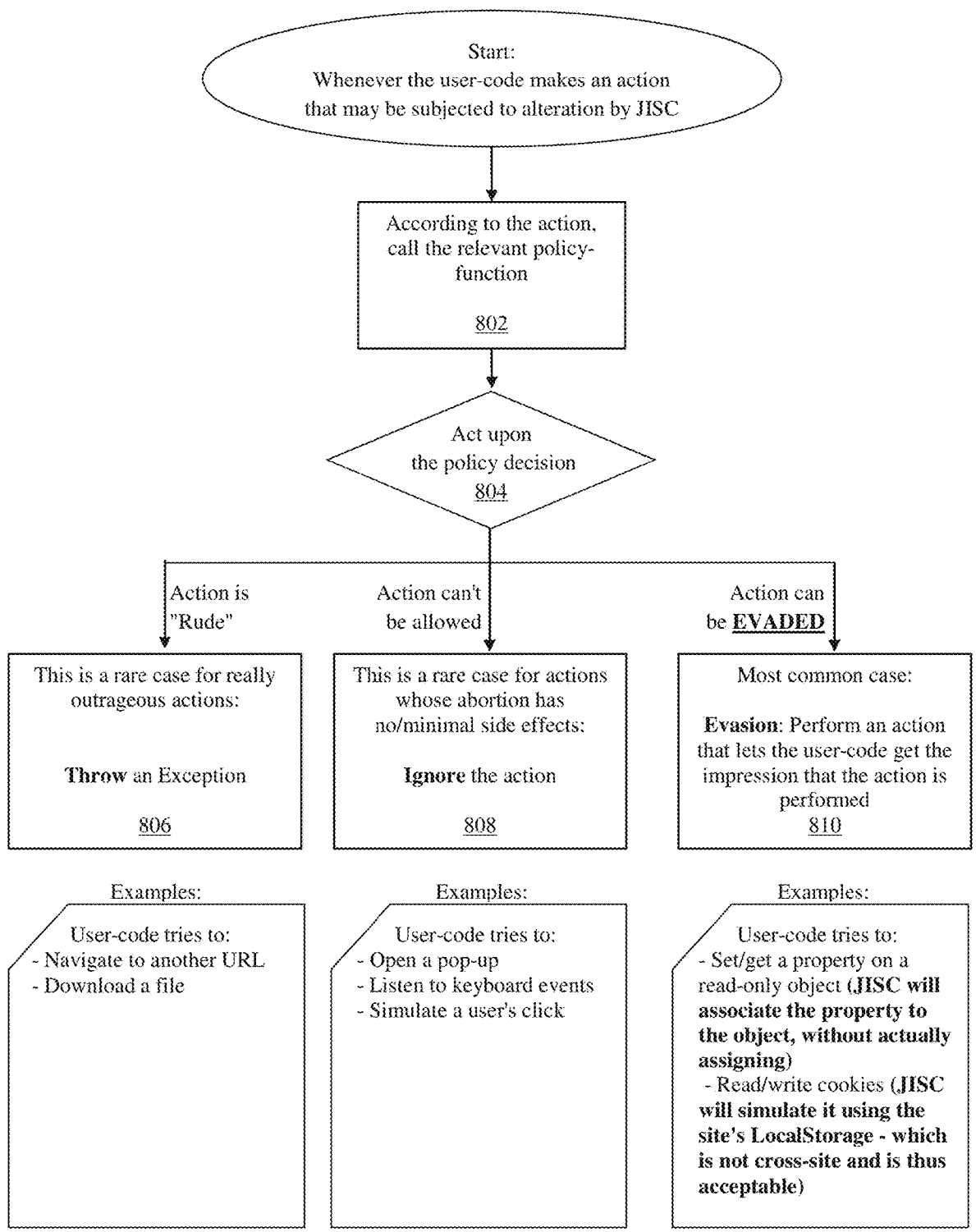
FIG. 8 is a flowchart of computer steps for how to handle different types of third party activity: Throwing an exception, Ignoring the action, and "Evasion" by performing an action that lets the user-code think that the action was performed when in fact it was not, which is essential to the smooth operation of third parties under JISC.

FIG. 8 demonstrates the computer processes, and the three categories of decisions that can be taken by the Policy-Center: Throw, Ignore, or Evade. This may occur whenever the User-Code (third-party code) makes an action that may be subjected to alteration by JISC. These processes are not modules per se, but rather a guide-line and a principle that is essential to the smooth operation of third-party code under JISC.

In step 802, the user-code tries to perform an action that may be altered by JISC; and calls the relevant policy-function according to the type of User-Code action.

In step 804, JISC consults the Policy-Center when JISC encounters a problematic third-party action, and it may perform one or more of the following methods in response: throw an exception; ignore the action; and/or evade the action.

On the very rare cases when the user-code action is "outrageous" or "rude"—the Policy-Center may decide to "Throw an Exception" (step 806), determining the user-code is malicious and illegitimate. This is very disruptive, and will usually render the third-party inoperative and useless. JISC only uses this rarely—when the third-party is trying to perform an action that is bluntly outrageous (such as navigating away from the site; or downloading a file to the device 104, 106).

On other rare cases when the Policy-Center cannot allow the user-code's action, and in the case of actions whose abortion has no or minimal side effects on the user-code, then the Policy-Center may decide to "Ignore the action" (step 808), without the user-code's awareness. Depending on the action and on the context, skipping an action could break the third-party's algorithm. JISC is only taking this course of action when it would have no negative side effects, or when there are no alternatives. Non-limiting examples of actions that fall into this category are when the User-Code tries to: open a pop-up; listen to keyboard events; and simulate a user's click.

In most cases, however, when the Policy-Center cannot allow the user-code's action, it decides to evade (step 810) the action. JISC will perform an action that lets the user-code get the impression that the action is performed, while preventing any visual or otherwise "real" effect on the browser. JISC is usually required to somehow remember the action (usually keeping the information in the object's Back-Pack), so that future actions by the user-code will perform as if the action was really made as-is.

Evasion is always the preferred and most common course of action, and involves performing the action in a different way, so as to make the third-party believe that the action is indeed performed normally. For example, a third-party could try to override "document.write". This is very intrusive—but, if performed responsibly, it is actually a legitimate action for a third-party to take. When JISC encounters this, then it will remember the new function that is set into "document.write"—but it will not actually set it in the "real world". When the third-party later calls "document.write"—then the override will be called, while if the website's code calls it—then the original "document.write" is called.

CORS-Proxy

Figure 9:
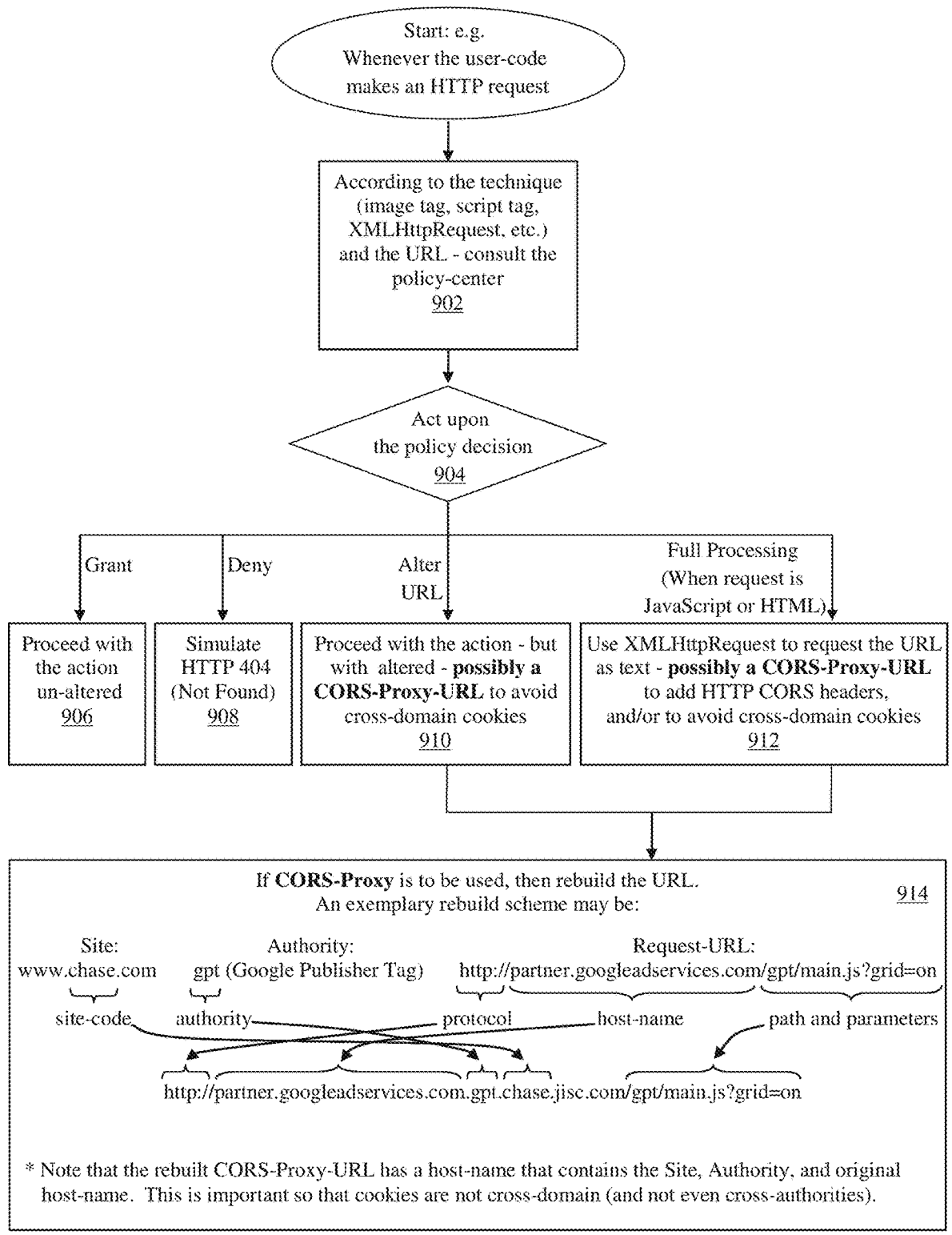
FIG. 9 is a flowchart of the computer steps involved in the CORS-Proxy process.

FIG. 9 is an illustration of the computer steps involved in the CORS-Proxy process. Whenever a third-party code tries to load some JavaScript from a server, it will usually use:

<script src="http://thirdparty/x.js">.

The browser will fetch and execute the URL, even if it is cross-origin (i.e. from another server). When JISC tries to emulate this, it cannot use the <script> tag because this would cause the third-party code to execute un-controlled. Thus, JISC loads such URLs using XMLHttpRequest (a.k.a. AJAX style). However, browsers do not allow an XMLHttpRequest to fetch cross-domain URLs unless the HTTP response contains "CORS Headers"—client-side cross-origin requests.

It is expected that websites will be able to ask third-party servers to provide these CORS headers, but if that does not work out, then JISC can only fetch these URLs via a "CORS Proxy": a proxy-server that simply adds the needed CORS headers to the original third-party response.

When JISC needs to get a JavaScript, an HTML, a WebAssembly or a CSS URL, it must get it textually—so that the text can be manipulated (JavaScript code should be instrumented, HTML code should be written with care, and CSS should look for inner URLs and layout-altering entries).

JISC can do that only via XMLHttpRequest, and the browser only allows that if the response contains the proper CORS HTTP headers. When CORS HTTP headers are not available, then JISC must proxy the request through a CORS proxy—which simply adds the CORS HTTP headers.

Another reason for a proxy is cookies: because cookies are stored at the browser under a host-name, then if the request is proxied, then the cookies are stored under the proxy's host-name, and thus become non-cross-platform. This implies that the proxy's host-name must contain the requesting site, the authority, and the URL's host-name.

This is further explained in FIG. 9. In step 902, JISC consults the policy-center on how to proceed, given the URL and its "kind" (i.e. based on whether this URL initiated by an <img> tag, or by <iframe> tag, or by image-CSS, etc.).

One decision could be "Grant" (step 906) which tells JISC to proceed as-is.

Another decision could be "Deny" (step 908) which tells JISC to proceed with an invalid URL that will surely fail.

In step 910, JISC is instructed to alter the URL, possibly altering it to a CORS-Proxy URL to avoid cross-domain cookies.

In step 912, JISC is instructed to fetch the URL using XMLHttpRequest, possibly altering it to a CORS-Proxy URL to add the proper CORS HTTP headers. Later, the response can be manipulated and converted to a data-URL.

Step 914 shows a possible way for JISC to transform a URL to a CORS-Proxy URL. The rebuilt CORS-Proxy-URL possesses a host name that contains the Site, Authority, and original host name in order for cookies not to be cross-domain and cross-authorities.

JISC-Debugger (GUI)

The instrumented-code that is generated by JISC could be extremely cumbersome and extremely frustrating to debug with. This becomes even a bigger issue considering the Intermitted-Execution mechanism. Because JISC is aimed at addressing a real-problem need, it must provide tools for third-party developers to debug their code when executed under JISC. As explained—letting these developers trace the instrumented-code is simply not realistic. So JISC has to provide a cross-platform debugger, that is executed without any special permissions inside the browser's standard JavaScript engine (and not as a plug-in, or a built-in function, as all existing debuggers are).

The main features of JISC-debugger are both traditional and JISC-unique. 1) It shows the un-instrumented third-party code, step-line, step-into, and step-out. 2) It allows evaluation of console input in the local scope. 3) It uses break-points that allow the third-party developer to set up a break-point in a specific location in the third-party code, and to break execution when the break-point is reached (break-upon-exception is also supported).

JISC adds unique break-point techniques, such as: 1) a property/variable is assigned/read/deleted, when the property's name, the owner object, and the assigned value pass some criteria; 2) a function is called, when the function-object and parameters pass some criteria; 3) an exception is thrown with an exception-object that passes some criteria; and 4) a DOM event is being handled, when the event-object passes some criteria.

When an object is assigned to a property/variable, the object is "marked" as being assigned to that property-name. This can be used in the criteria. For example:

var myFunc=function( ) { . . . };

The function-object remembers that it is assigned to "myFunc", so the developer can set a breakpoint as wild as: "Break when a function object that was once assigned to "myFunc", is been called.".

FireBug-style "Disable": this feature (which is only currently supported by FireBug® for FireFox®) means that if the developer sets a disabled-breakpoint on some line, then the debugger will never break on that line—even if an exception is thrown there.

Additionally, JISC-Debugger has a proper GUI (Graphic User Interface), but it is important to note that JISC supports most of the debugging functionalities without a need for GUI, using function-calls that can be typed by the developer via a native Java-Script console (such as FireBug).

When JISC is asked to, it establishes a dedicated window for the debugger, like this:

window.open(
'. . . /jisc-debugger-console.html',
'JISC-Debugger');

This will open "jisc-debugger-console.html" in either a new pop-up, or an existing pop-up/iframe with the name "JISC-Debugger".

Figure 10:
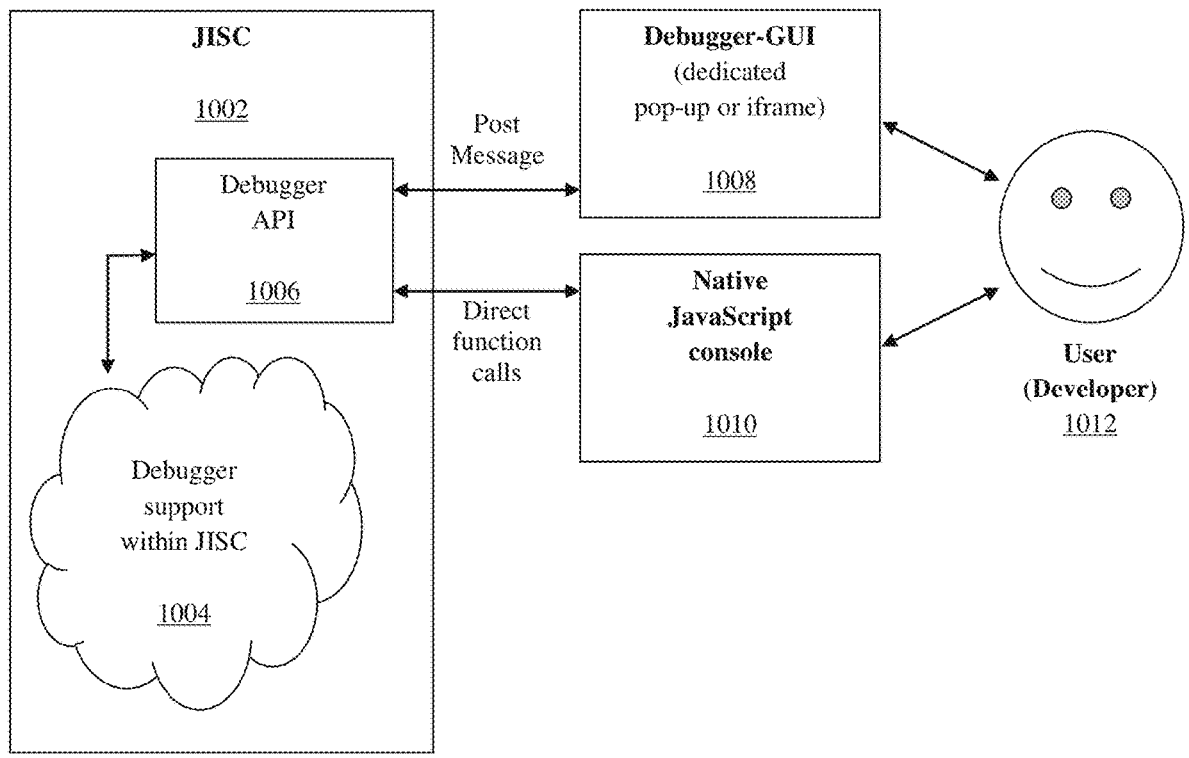
FIG. 10 is a system architecture of the JISC-Debugger.

FIG. 10 illustrates the JISC-Debugger system architecture and how the user interacts with the JISC-Debugger comprising: the JISC 1002 with the Debugger API 1006 and the Debugger support within JISC 1004; and communicating with a Debugger-GUI 1008 and a Native JavaScript 1010 of a developer 1012. JISC 1002 includes many modules and systems that are supporting the debugging functionality 1004. A special object—which is accessible outside of JISC ("windw.jiscDebugger") contains a set of debugging functions i.e. Debugger API 1006.

These functions are called (via "window.postMessage") by the dedicated JISC-Debugger window 1008 according to the user's interaction, or when the user 1012 types into a Native JavaScript console 1010.

Break-Points in JISC-Debugger

Probably the hardest feature of a debugger is support for break-points.

Figure 11:
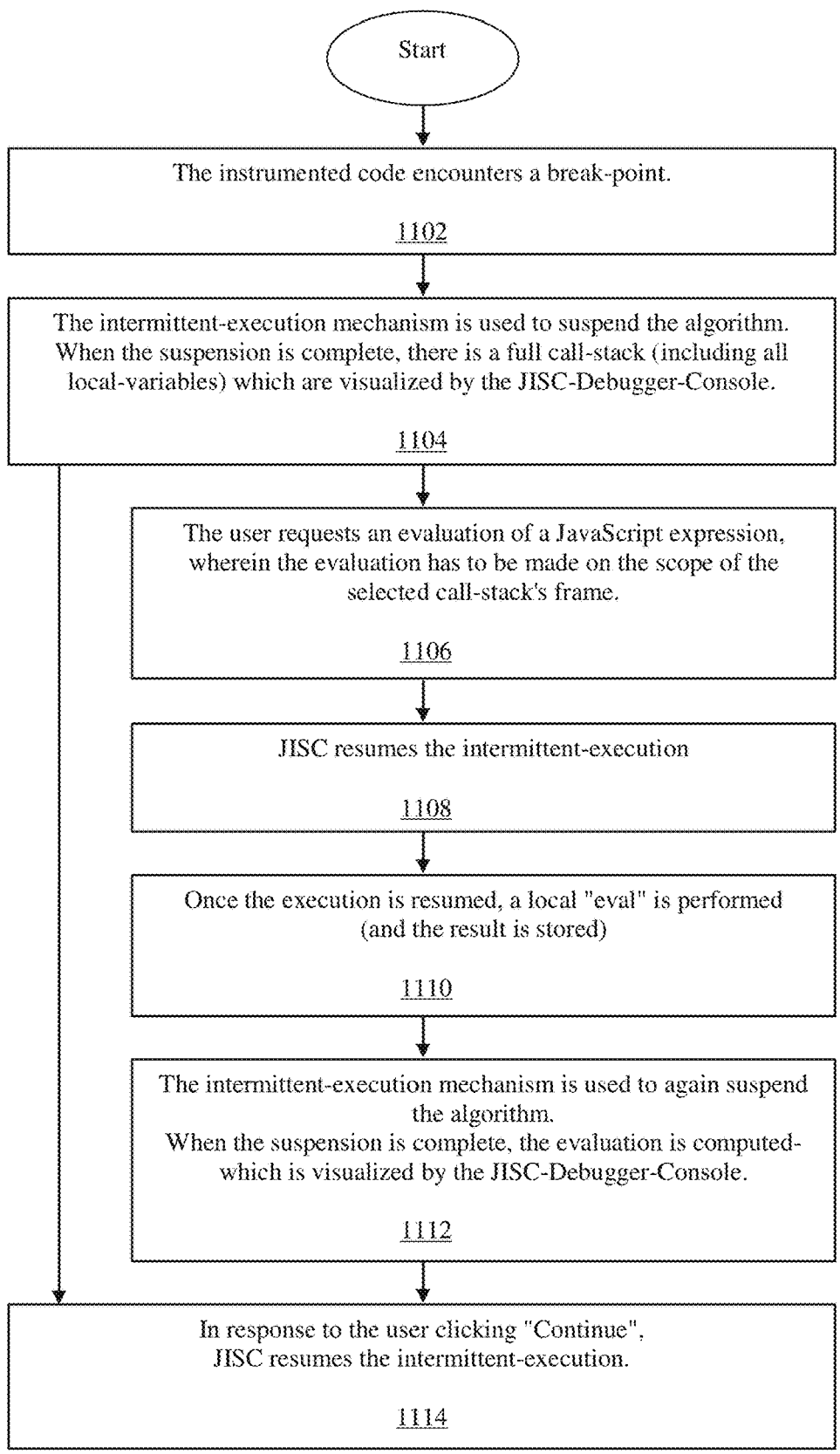
FIG. 11 is a flowchart of computer steps in an exemplary embodiment of the JISC-Debugger.

FIG. 11 provides a flowchart of computer steps for when the JISC encounters a break-point. FIG. 11 also illustrates how JISC-Debugger suspends and resumes the execution upon a break-point, and how the user/developer can evaluate a JavaScript expression in the local scope of the break-point's function anywhere along the call-stack.

In step 1102, the instrumented-code reaches a conclusion that a break-point is reached (either a line-number is reached, or an exception is thrown, or any advanced scenario occurs that the user defined).

In step 1104, the intermittent-execution mechanism is used to suspend the algorithm. When the suspension is complete, there is a full call-stack (including all local-variables) which are visualized by the JISC-Debugger-Console.

In step 1106, the user requests an evaluation of a JavaScript expression. Note that the evaluation has to be made on the scope of the selected call-stack's frame.

In step 1108, JISC resumes the intermittent-execution

In step 1110, once the execution is resumed, a local "eval" is performed (and the result is stored).

In step 1112, the intermittent-execution mechanism is used again to suspend the algorithm. When the suspension is complete, the evaluation is provided—which is visualized by the JISC-Debugger-Console.

In step 1114, the user clicks "Continue": then JISC resumes the intermittent-execution.

Exemplifications of JISC Working with Other Non-JavaScript Code

HTML: when the third-party code is calling—for example—"document.write(html)", then JISC code parses the written HTML and carefully writes it into the DOM using "document.createElement" and similar methods—seeking advices from the "Policy" system along the way.

CSS: Style-sheets can contain problematic definitions. JISC code parses the CSS and possibly alters it.

WebAssembly: For example, all the calls that it makes to Java-Script functions must be safely wrapped.

Adobe-Flash®: JISC utilizes a Flash-Wrapper module for Adobe-Flash.

Flash-Wrapper

Figure 12:
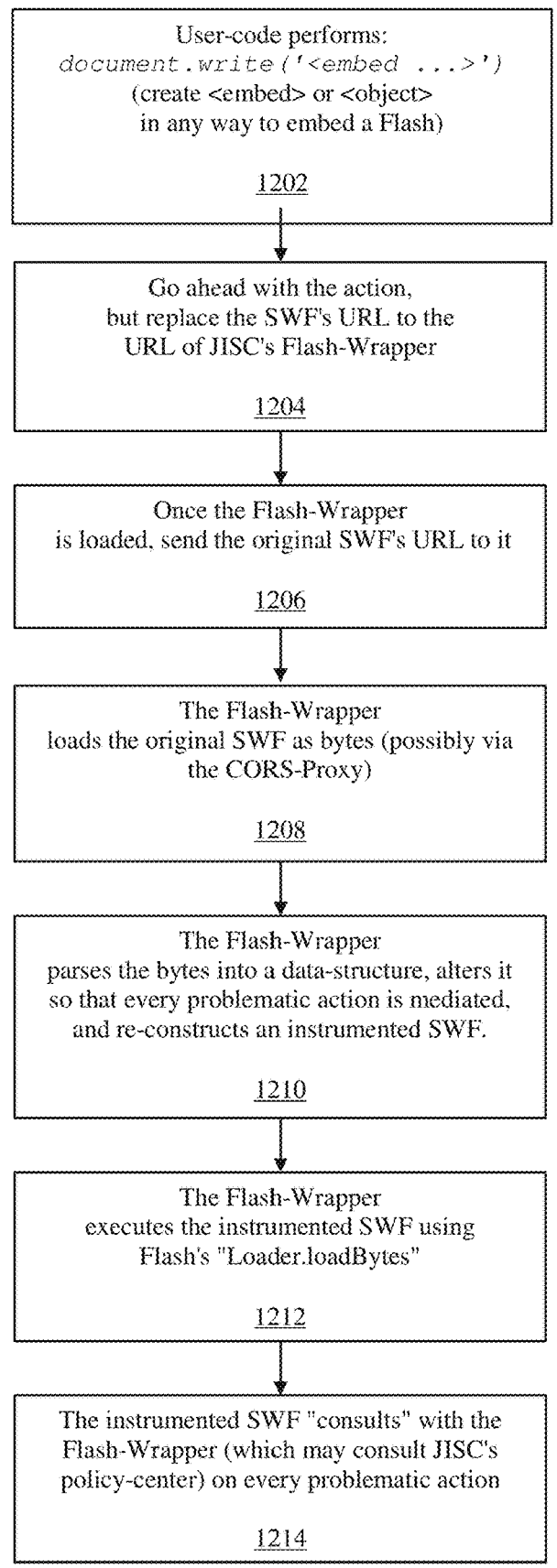
FIG. 12 is an illustration of computer steps for the Flash-Wrapper module.

FIG. 12 is an illustration of computer steps for the Flash-Wrapper module. Adobe® Flash-Player: Flash-Wrapper can perform a wide range of potentially problematic actions, including freely injecting JavaScript code to the page. JISC is able to execute Flash (a "SWF" file) inside the belly of a proprietary Flash that knows how to load a third-party Flash, to instrument it, and then to execute it, and monitor every action the Flash tries to do, again—seeking advices from the "Policy" system along the way. The actions that needs monitoring are, by way of non-limiting examples: 1) performing HTTP calls; 2) interacting with the JavaScript on the page; 3) opening a pop-up, 4) navigating away, 5) echoing sound (this is considered to be intrusive, and sites usually only allow this upon mouse-hover or after a mouse-click), 6) using too much CPU (too high frame-rate), and more.

In the method of the present embodiment, the Flash-Wrapper initially loads the "real" Flash URL—not as a SWF file, but rather as raw bytes. It will then: 1) parse it; 2) alter it (a.k.a. instrument it); 3) rewrite it; and 4) execute it—the altered Flash will interact with the wrapping Flash throughout the execution, preventing and evading any unwanted action.

The parsing works on the following parts of the loaded SWF:

(1) The SWF's header.

(2) All the Action-Script Byte-Code (ABC) tags—i.e. the parts of the SWF that contain compiled ActionScript code. Byte-code is a basic assembly-like set of commands that are the result of the compilation of ActionScript (a language similar to JavaScript that can be used when building a Flash).

(3) Additional tags that may contain URL's. For each URL, the Flash-Wrapper "consults" with JISC (via ExternalInterface.call) and it may alter the URL.

The Flash-Wrapper looks for these op-codes (Action-Script commands):
  getproperty
  setproperty
  Call-function op-codes:
    construct
    constructprop
    call
    callsuper
    callsupervoid
    callproperty
    callpropvoid
    callproplex For each of these, Flash-Wrapper replaces the op-code with a set of op-codes that allows JISC to inspect, and possibly alter the behavior of the op-code.

Some of the call-function op-codes that are of interest are:
  ExternalInterface.call
  ExternalInterface.addCallback
  navigateToURL
  new URLRequest The main "getproperty" op-code that is of interest is the getter for URLRequest.url. The main "setproperty" op-code that is of interest is the setter for URLRequest.url.

All HTTP requests that are made by ActionScript code are using URLRequest, so controlling the value of "URLRequest.url" is controlling all HTTP requests.

The Flash-Wrapper method is further explained in FIG. 12, where in step 1202, JISC is instructed by the user-code to construct a Flash-player.

In step 1204, JISC constructs the Flash-player, however it does not use the URL that is provided by the user-code, but instead JISC uses the Flash-Wrapper URL, and waits for it to load.

In steps 1206 and 1208, the Flash-Wrapper is loaded, and JISC instructs it to load the original URL as bytes.

In step 1210, the Flash-Wrapper parses the loaded SWF file into internal data-structure. The Flash-Wrapper then alters some elements in the internal data-structure: URLs may be changed (possibly to CORS-Proxy URLs), and most importantly—ActionScript™ is altered. The Flash-Player then re-constructs the SWF from the altered internal data-structure.

In step 1212, the Flash-Wrapper executes the re-constructed SWF using Flash's "Loader.loadBytes"

In step 1214, the instrumented SWF "consults" with the Flash-Wrapper (which may consult JISC's policy-center) on every problematic action.

Back-Pack Objects Versus Proxy Objects

JISC must store state-information for various JavaScript objects, such as the "window" object, HTML elements, user-code created objects, and others. The state-information instructs JISC how to apply user-code actions on the object: setting/getting properties of the object, calling the object (for function-objects) and some other manipulations. For example, the setting and getting properties of the "window" object will be subject to very tight inspection and alteration, while user-code created objects (e.g. "var x={a:1};") will allow every manipulation.

Another example: when the user-code does "window.x=1;", then JISC will usually store this in the Back-Pack, so that the "window" object does not really change. Later, when the user-code reads the value of "window.x", JISC will provide the stored value (which was "1").

There are two ways to store state-information: "proxy-object" and "back-pack-object. In the proxy embodiment, a proxy-object is established per every problematic object (such as the "window" object), and makes totally sure that the user-code never ever gets a reference to the real "window" object. Instead, the user-code gets a reference to the window-proxy object—an object that intermediates between the user-code and the "real" object, and that can properly handle every user-code manipulation. This approach is fast, but is inherently un-secured: if, by any conceivable way (including site-specific policy settings—which are very hard to systematically detect and prevent), the user-code succeeds in obtaining a reference to the "real" object (such as "window")—it can manipulate it freely, and all chaos ensues.

In the back-pack embodiment, JISC chooses the "back-pack" approach, which is slower, yet more secure. In this approach, a "back-pack object" is attached to every object that the user-code encounters. A method of attaching the back-pack to the object is disclosed in FIG. 13, and the method of getting a reference to the back-pack from the object is disclosed in FIG. 14.

Because all state-information is stored in the back-pack, the user-code can have references to all objects—even to sensitive objects such as "window". When the user-code encounters an object that has no back-pack, then JISC assumes the worst—and prevents all manipulations on the object. Because back-pack objects live internally within JISC—it is much easier to make sure they are never exposed to the user-code or to the non-JISC code.

How and when are back-packs created: when the user-code does "window.x={ };", then JISC will automatically create a "full-access" back-pack for it.

As for sensitive objects—JISC will initially create a window-back-pack for the "window" object. Then, when the user-code performs "window.document", the window-back-pack will know to create a new document-back-pack for "window.document".

Similarly, specific back-packs are created for every sensitive object when that object is first referenced: JISC uses the reference itself to figure out what kind of object is referenced—and what kind of back-pack to assign to it.

Figure 13:
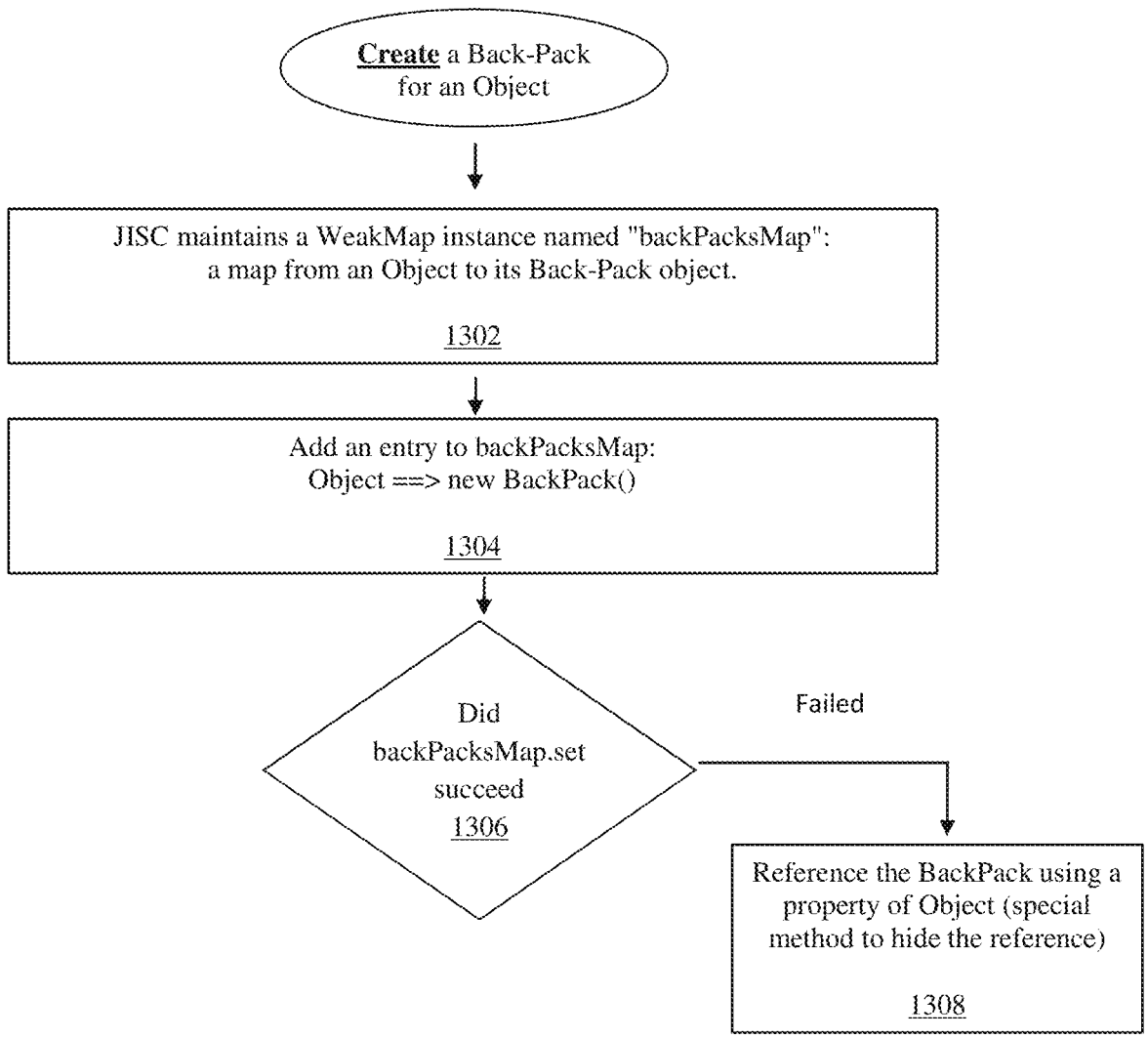
FIG. 13 is a flowchart of computer steps for creating a back-pack for an object.

FIG. 13 illustrates how Back-packs are associated to real objects. In step 1302, JISC maintains a WeakMap instance named "backPacksMap": a map from an Object to its Back-Pack object.

When JISC tries to associate a new back-pack to a real object, it will (step 1304) try to add an entry into "back-PacksMap". A WeakMap cannot hold all objects: FireFox, for example, does not allow using "window.location" as keys to a WeakMap. So if that fails (step 1306), JISC will use this method to associate the back-pack to the object (step 1308), using a JavaScript along these lines:

```
(function( ){        // JISC scope-function
                     var _object; // \_ These are local variables:
                     var _backPack; // / invisible to outside code
                     function setBackPack(object, backPack) {
                             object.jisc = function( ) {
                                     _object = object:
                                     _backPack = backPack:
                             };
                     }
                     function getBackPack(object) {
                             try {
                                     object.jisc( ):
                                     if (_object === object)
                                             return _backPack;
                             }catch(e) { }
                     }
})( );
```

This methodology prevents any non-JISC code (code that is outside of JISC's scope-function) to tweak the back-pack reference or to read it (albeit, outside code could delete the reference—but that is not a security breach: the object will just become non-accessible to the user-code).

Figure 14:
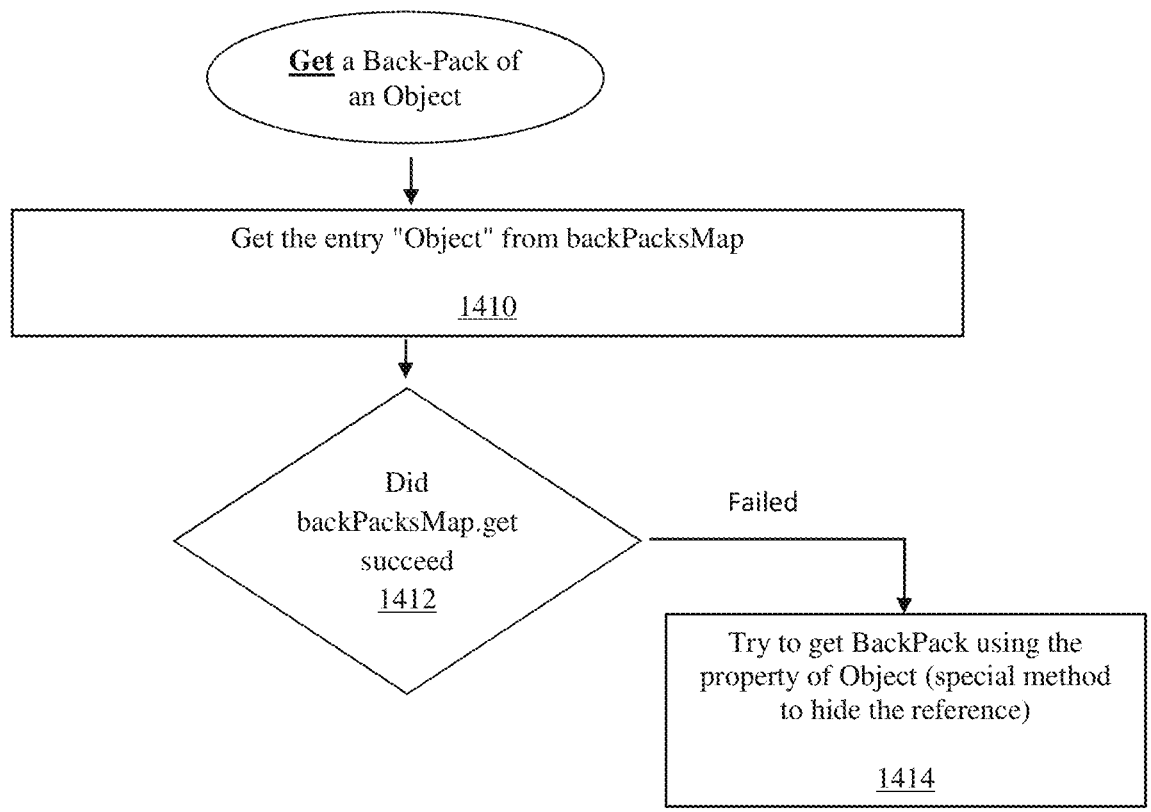
FIG. 14 is a flowchart of computer steps for getting a back-pack of an object.

In FIG. 14, step 1410, JISC tries to get the back-pack of an object by using the WeakMap. If that fails (step 1412), JISC uses the special method described above to get the back-pack (step 1414).

CONCLUSION

The aforementioned flowchart and diagrams illustrate the architecture, functionality, and operation of possible implementations of systems, methods, and computer media according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Likewise, the terms "one or more" and "plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed at the same point in time.

Although various features of the invention may be described in the context of a single embodiment, the features may also be provided separately or in any suitable combination. Conversely, although the invention may be described herein in the context of separate embodiments for clarity, the invention may also be implemented in a single embodiment. References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an example embodiment," do not necessarily refer to the same embodiment.

It is to be understood that the phraseology and terminology employed herein is not to be construed as limiting and are for descriptive purpose only.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

What is claimed is:

1. A system for limiting activity of user-code on a user computing device running a browser, the system comprising: a memory; a JavaScript Instrumenter to Secured Code (JISC) cloud running on a first server adapted to tailor a JISC module for a website running on a second server, wherein the second server is adapted to instruct the browser running on the user device to load the JISC module from the JISC cloud, wherein the user-code is known to be associated with the website such that the website instructs the browser to load the user-code, wherein the JISC module comprises a policy for the user-code, and wherein the JISC module running in the browser is adapted to:
   load the user-code,
   generate instrumented-code based on the user-code,
   execute the instrumented-code, and limit an activity of the instrumented-code according to the policy, wherein the JISC module is adapted for intermittent asynchronous execution of the instrumented-code; and d) initiate of an intermission in the execution of the instrumented-code, by:
   i. directing the browser, by the instrumented-code, to determine if a time to execute exceeds a set limit, and when the time limit is exceeded, instructing the browser, by the instrumented-code, to build a currently executing subroutine call-stack frame for a currently executing subroutine,
   ii. when the currently executing subroutine is called by a subsequent caller subroutine, building a subsequent caller subroutine call-stack frame for the subsequent caller subroutine and referencing the currently executing subroutine's call-stack frame by the subsequent caller subroutine's call-stack frame,
   iii. repeating ii for every subsequent caller subroutine, and when the currently executing subroutine or a subsequent caller subroutine is not called by another subsequent caller subroutine, then scheduling a comeback time.

2. The system of claim 1, wherein the user-code is loaded as text.

3. The system of claim 1, wherein the instrumented-code is one of JavaScript or Web Assembly code.

4. The system of claim 1, wherein the JISC cloud is adapted to tailor the JISC module according to a browser type.

5. The system of claim 1, wherein the JISC module adaptation to limit an activity includes an adaptation to throw an exception, ignore an activity, or evade an activity.

6. The system of claim 1, wherein the JISC module comprises a back-pack object attached to at least one object that the user-code encounters, wherein the back-pack object stores state information for the at least one object that the user-code encounters.

7. The system of claim 1, wherein the JISC module is adapted to determine whether to grant, deny, alter, or fully process HTTP requests in the user-code according to the policy.

8. The system of claim 7, further comprising a cross-origin resource sharing (CORS)-proxy, for proxying the HTTP requests from the user-code that the JISC module has determined should be altered or fully processed according to the policy.

9. The system of claim 1, further comprising a JISC debugging system adapted for one or more of showing the user-code un-instrumented, allowing evaluation of the user-code via a JISC debugging console, and setting a break-point in a specific location in the user-code.

10. The system of claim 1, wherein the JISC cloud is adapted to record actions of the user-code for analysis and reporting.

11. A method for limiting activity of user-code on a user computing device running a browser, the method comprising:

a) tailoring a JISC module by a JavaScript Instrumenter to Secured Code (JISC) cloud running on a first server for a website running on a second server, wherein the JISC module comprises a policy for the user-code and wherein the user-code is known to be associated with the website such that the website instructs the browser to load the user-code;

b) instructing a browser running on the user device to load the JISC module from the JISC cloud by the website;

c) running the JISC module in the browser to:
   load the user-code,
   generate instrumented-code based on the user-code,
   execute the instrumented-code, and
   limit the activity of the instrumented-code according to the policy, wherein the JISC module is adapted for intermittent asynchronous execution of the instrumented-code; and d) initiate an intermission in the execution of the instrumented-code, by:
   i. directing the browser, by the instrumented-code, to determine if a time to execute exceeds a set limit, and when the time limit is exceeded, instructing the browser, by the instrumented-code, to build a currently executing subroutine call-stack frame for a currently executing subroutine,
   ii. when the currently executing subroutine is called by a subsequent caller subroutine, building a subsequent caller subroutine call-stack frame for the subsequent caller subroutine and referencing the currently executing subroutine's call-stack frame by the subsequent caller subroutine's call-stack frame,
   iii. repeating ii for every subsequent caller subroutine, and when the currently executing subroutine or a subsequent caller subroutine is not called by another subsequent caller subroutine, then scheduling a comeback time.

12. The method of claim 11, further comprising: by the JISC module,
   iv. following arrival of the comeback time, executing the instrumented-code in a top-level call-stack frame context,
   v. restoring all local variables by the currently executing or subsequent caller subroutine and skipping to a restoration point,
   vi. when a restore index references a call currently executing or subsequent caller subroutine command, calling the currently executing or subsequent caller subroutine in a next call-stack frame context, and
   vii. when the restoration is complete, continuing execution normally without a call-stack context.

13. The method of claim 11, further comprising loading the user-code as text.

14. The method of claim 11, wherein the instrumented-code is one of JavaScript or WebAssembly code.

15. The method of claim 11, further comprising adapting the JISC module according to a browser type by the JISC cloud.

16. The method of claim 11, wherein limiting the activity comprises one of limiting the activity by throwing an exception, ignoring the activity, or evading the activity.

17. The method of claim 11, wherein the JISC module comprises a back-pack object, the method further comprising attaching at least one object that the user-code encounters to the back-pack object, wherein the back-pack object stores state information for the at least one object that the user-code encounters.

18. The method of claim 17, further comprising, by the JISC module: getting a reference to the back-pack object by attempting to get the back-pack using a WeakMap, and if the attempt fails, create a fresh back-pack for the object and store it in the WeakMap for later reference.

19. The method of claim 11, further comprising: providing a CORS-proxy, and by the JISC module, granting, denying, altering, or fully processing HTTP requests of the user-code according to the policy, wherein HTTP requests that are altered or fully processed are proxied via the CORS-proxy.

20. The method of claim 11, further comprising: providing a JISC debugging system adapted for one or more of: showing the user-code un-instrumented, allowing evaluation of the user code via a JISC debugging console, and setting a break-point in a specific location in the user-code.

21. The method of claim 11, further comprising: by the JISC cloud, recording actions of user-code for analysis and reporting.

* * * * *